US012810674B2

(12) United States Patent
Hyde

(10) Patent No.: US 12,810,674 B2
(45) Date of Patent: Nov. 24, 2026

(54) MOBILE VENDOR ACCESS MANAGEMENT SYSTEM FOR HEALTH CARE ENVIRONMENTS

(71) Applicant: Matthew John Hyde, Redondo Beach, CA (US)

(72) Inventor: Matthew John Hyde, Redondo Beach, CA (US)

( * ) Notice: Subject to any disclaimer, the term of this patent is extended or adjusted under 35 U.S.C. 154(b) by 90 days.

(21) Appl. No.: 18/977,187

(22) Filed: Dec. 11, 2024

(65) Prior Publication Data

US 2025/0191430 A1 Jun. 12, 2025

Related U.S. Application Data

(60) Provisional application No. 63/608,545, filed on Dec. 11, 2023.

(51) Int. Cl.

| | |
|---|---|
| ***G07C 9/37*** | (2020.01) |
| ***G06V 40/12*** | (2022.01) |
| ***G06V 40/16*** | (2022.01) |
| ***G06V 40/70*** | (2022.01) |

(52) U.S. Cl.

CPC ........... *G07C 9/37* (2020.01); *G06V 40/1365* (2022.01); *G06V 40/172* (2022.01); *G06V 40/70* (2022.01)

(58) Field of Classification Search

CPC .... G07C 9/37; G06V 40/1365; G06V 40/172; G06V 40/70

See application file for complete search history.

(56) References Cited

U.S. PATENT DOCUMENTS

| | | | | |
|---|---|---|---|---|
| 8,443,200 | B2 | 5/2013 | Karthik | |
| 8,690,773 | B2 | 4/2014 | Bagan | |
| 9,672,336 | B1 * | 6/2017 | Spence | G06F 21/32 |
| 10,916,082 | B2 | 2/2021 | Friedman et al. | |
| 10,970,953 | B2 | 4/2021 | Tulsidas | |
| 11,017,097 | B2 | 5/2021 | Ching | |
| 11,321,554 | B2 | 5/2022 | Edelen et al. | |
| 11,694,476 | B2 | 7/2023 | Lehman | |
| 12,245,035 | B2 * | 3/2025 | Aabye | G06F 21/35 |
| 2004/0230809 | A1 * | 11/2004 | Lowensohn | G06F 21/35 713/186 |
| 2006/0120571 | A1 | 6/2006 | Tu et al. | |
| 2010/0183199 | A1 | 7/2010 | Smith et al. | |
| 2013/0300867 | A1 * | 11/2013 | Yoder | H04N 7/18 348/143 |
| 2015/0116111 | A1 | 4/2015 | Foster | |

(Continued)

OTHER PUBLICATIONS

Panchal et al., "Designing Secure and Efficient Biometric-Based Access Mechanism for Cloud Services," IEEE Transactions on Cloud Computing Year: 2022 | vol. 10, Issue: 2 | Journal Article | Publisher: IEEE.*

(Continued)

*Primary Examiner* — Roderick Tolentino
(74) *Attorney, Agent, or Firm* — Dunlap Bennett & Ludwig PLLC

(57) ABSTRACT

A device for verification includes an access control unit. The access control unit includes at least two information capture devices. The at least two information capture devices acquire independent identification information for verification of a user. The device also includes a pedestal coupled to the access control unit comprising one or more wheels.

8 Claims, 3 Drawing Sheets

(56) References Cited

U.S. PATENT DOCUMENTS

| | | | | |
|---|---|---|---|---|
| 2015/0223890 | A1* | 8/2015 | Miller | A61B 50/10 726/17 |
| 2017/0024700 | A1* | 1/2017 | Shahulhameed | G06F 3/0481 |
| 2017/0111175 | A1* | 4/2017 | Oberhauser | G06F 21/33 |
| 2019/0124080 | A1* | 4/2019 | Caluwaert | G06F 16/9566 |
| 2021/0125111 | A1 | 4/2021 | Simon | |
| 2021/0335069 | A1 | 10/2021 | Ahn | |
| 2022/0270727 | A1* | 8/2022 | Ananda | G06K 7/1417 |
| 2022/0359091 | A1 | 11/2022 | Dohrmann et al. | |
| 2022/0383683 | A1 | 12/2022 | Ullmann et al. | |
| 2023/0080322 | A1* | 3/2023 | Smith | H04L 63/123 726/7 |
| 2023/0133330 | A1 | 5/2023 | Hawkins et al. | |
| 2023/0136558 | A1 | 5/2023 | Hawkins et al. | |
| 2024/0305441 | A1* | 9/2024 | Ramadhane | H04L 9/06 |

OTHER PUBLICATIONS

Jing, Wu; "A Decentralized User Authentication Model Based on Activity Proof : Use the new user identity credential: activity map," 2020 International Conference on Communications, Information System and Computer Engineering (CISCE) Year: 2020 | Conference Paper | Publisher: IEEE.*

* cited by examiner

MOBILE VENDOR ACCESS MANAGEMENT SYSTEM FOR HEALTH CARE ENVIRONMENTS

CROSS-REFERENCE TO RELATED APPLICATIONS

This application claims the benefit of priority of U.S. provisional application No. 63/608,545, filed Dec. 11, 2023, titled "MOBILE VENDOR ACCESS MANAGEMENT SYSTEM FOR HEALTHCARE ENVIRONMENTS," the entire contents of which are herein incorporated by reference.

FIELD

The present invention relates to access control systems and, more particularly, to access control and management systems in healthcare environments.

BACKGROUND

Access control management and security are critical in healthcare environments due to the sensitive and confidential nature of patient information. Healthcare organizations must comply with various regulations and standards that mandate the protection of patient information and controlled substances maintained by the healthcare organizations.

As can be seen, there is a need for improved systems for access control management.

SUMMARY

In one aspect of the present disclosure, a device for verification includes an access control unit. The access control unit includes at least two information capture devices. The at least two information capture devices acquire independent identification information for verification of a user. The device also includes a pedestal coupled to the access control unit comprising one or more wheels.

In another aspect of the present disclosure, a method for verification includes receiving, from a user, a request to access a hospital facility received at a mobile access device. The method includes capturing at least two types of biometric information from a user at the mobile access device. The method also includes verifying the at least two types of biometric information from the user. The method includes, upon successful verification, printing a badge for the user that grants access to the hospital facility.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

Current hospital vendor management systems only employ a username and password login via keyboard, or a QR code that can be shared amongst users. These solutions do not work well due to the level of risk in system access requirements. A simple email username and password or QR code is all that is required to gain entry to hospitals. This exposes security risks as anyone with a username and password login or QR code screenshot can gain access to all areas of a hospital, including individuals who have not complied with the hospital policies or state/federal statutes. For example, users from different vendor companies can easily share login information across multiple different vendor companies. This leads to vendors accessing hospitals they are not allowed to by policy or by state/federal law. No current vendor access management company provides hardware and/or software technology that encompasses multiple access control technologies and user verification in a single platform.

Broadly, an embodiment of the present invention provides a system and process for mobile access management device (hereinafter "mobile AMD") and an access system that provides access control technologies and user verification in a single platform. The mobile AMD includes facial recognition, iris scanning, vein recognition scanning, refreshed QR code scanning, or combination thereof, which eliminates any ability to share login information by hospital vendors, e.g., sales & service representatives. The mobile AMD eliminates the possibility of entry onto hospital premises by an individual who has not met all Hospital access requirements. As such, the mobile AMD can eliminate the ability for users to take advantage of this security point of failure, which significantly improves compliance with hospital policy and state/federal law.

Figure 1:
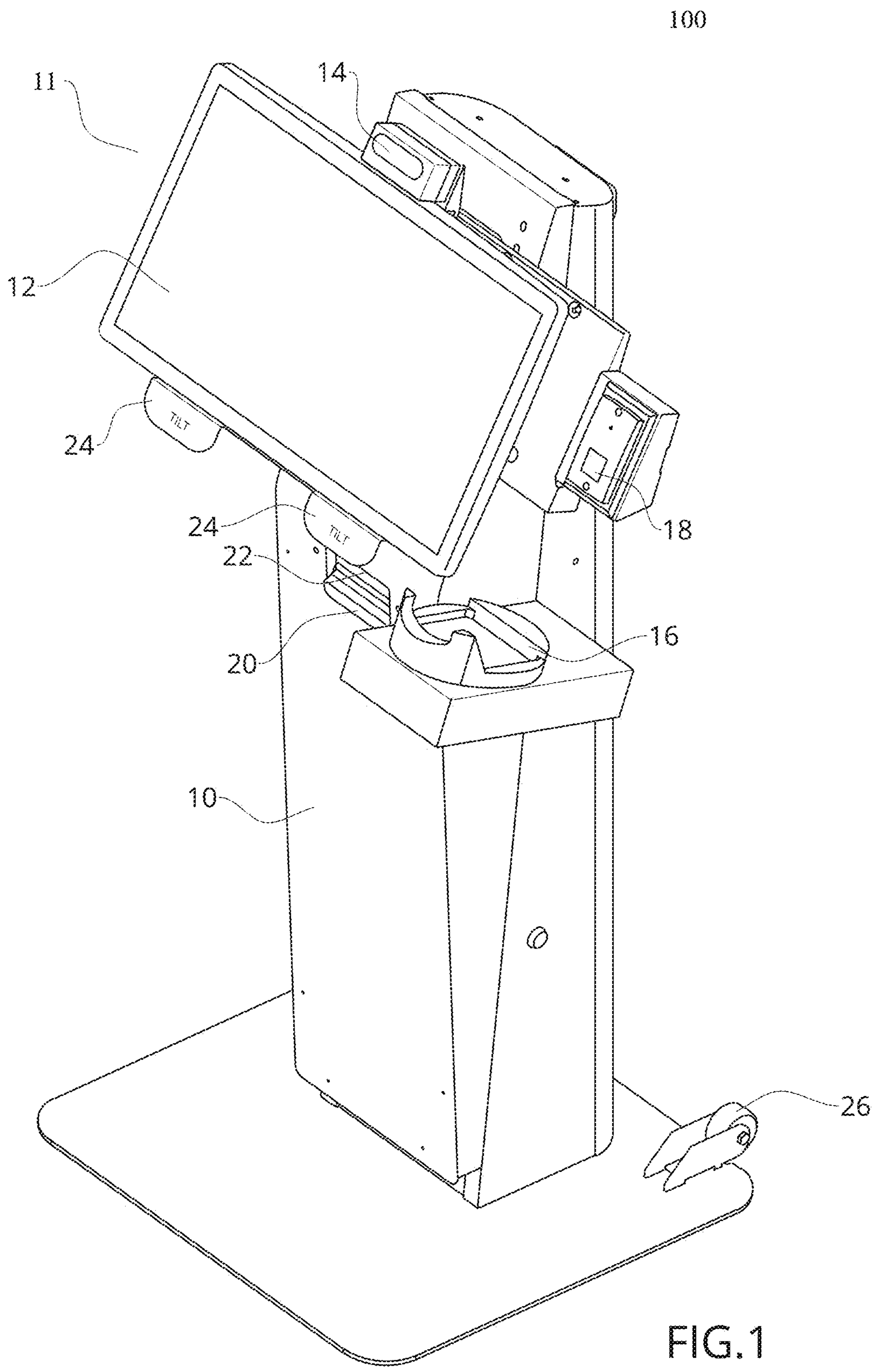
FIG. 1 is a front perspective view of a mobile access management device, according to aspects of the present disclosure.
Figure 2:
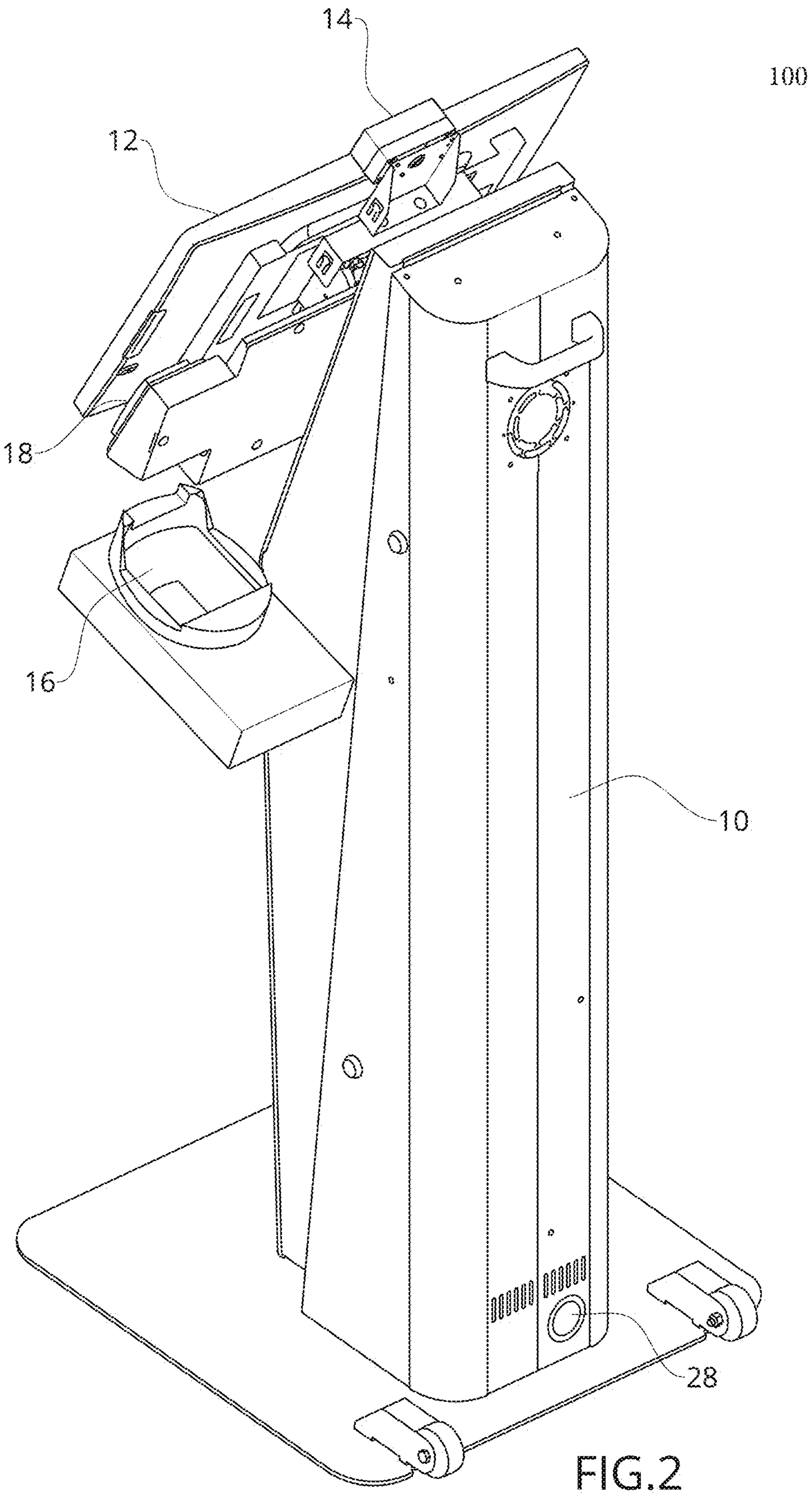
FIG. 2 is a rear perspective view of a mobile access management device, according to aspects of the present disclosure.
Figure 3:
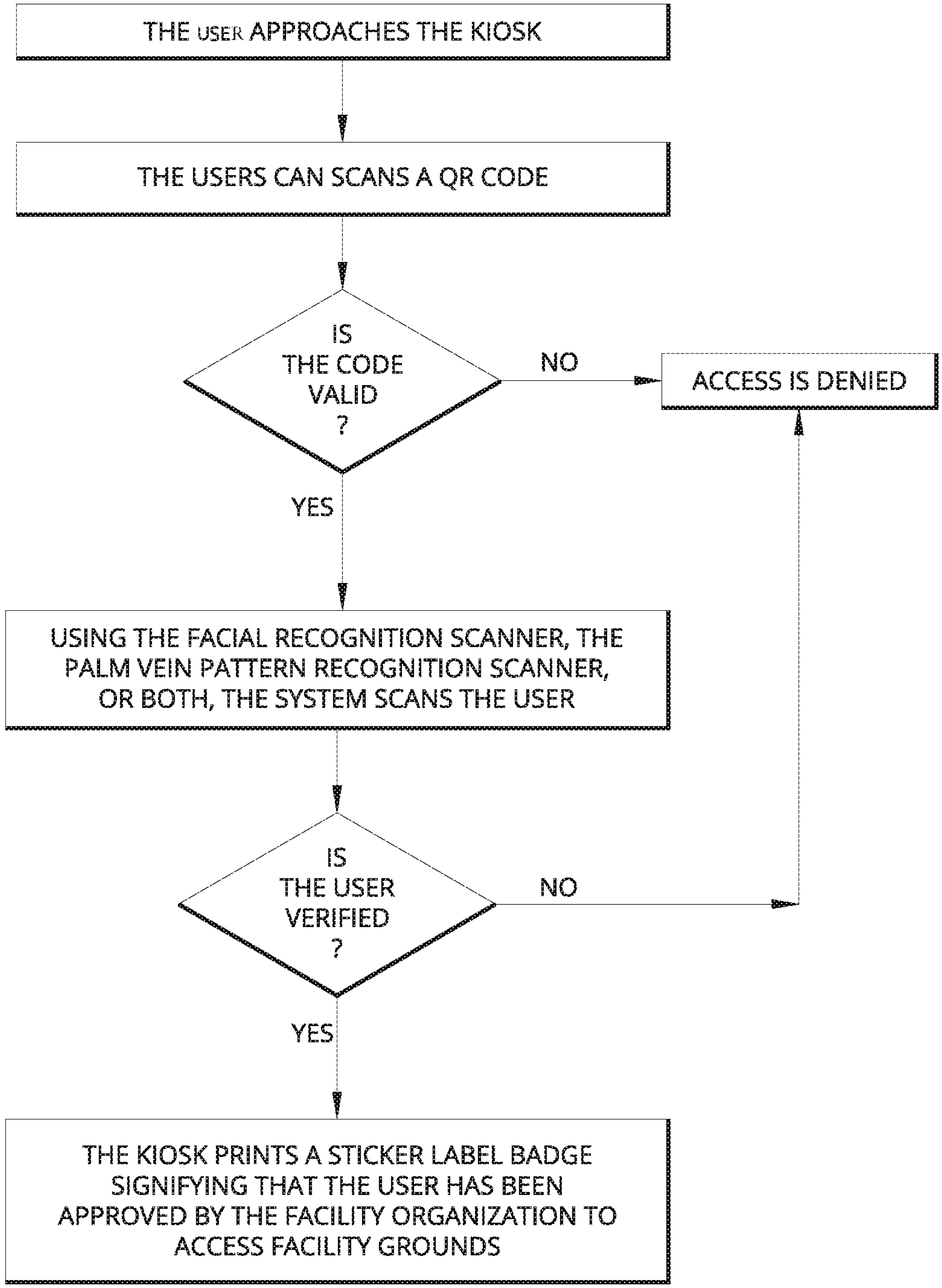
FIG. 3 is a flow diagram of a verification process, according to aspects of the present disclosure.

Referring now to FIGS. 1-3, FIGS. 1 and 2 illustrate a mobile access management device ("mobile AMD") 100, according to aspects of the present disclosure. While FIGS. 1 and 2 illustrate examples of components of the mobile AMD 100, additional components can be added and existing components can be removed and/or modified.

Healthcare companies can leverage the mobile AMD 100 for any and all access to healthcare facilities, e.g., hospital grounds. The mobile AMD 100 enables biometric scanning methods can be used with no option for typed username/password system access. This speeds up the rate with which vendors can gain access, improves hospital security by eliminating "phantom" logins using shared login credentials, ensures companies and sales/service reps are maintaining hospital and state/federal compliance, and the like.

As illustrated in FIGS. 1 and 2, the mobile AMD 100 includes an access control unit 11 coupled to a pedestal 10. The pedestal 10 can include one or more wheels 26 that allow the mobile AMD 100 to be moved to different locations. For example, the wheels 26 can be lockable and oscillating. In some embodiments, the access control unit 11 can be housed in a hard plastic encasing.

The access control unit 11 serves as the primary data collection device for users and visitors entering a healthcare facility. The access control unit 11 can include the components of a computing device, e.g., processing devices, memories, communication devices, etc. Additionally, the access control unit 11 can store and execute access control software/programs to perform the process described herein. The access control unit 11 can include several types of biometric scanning devices, for example, a finger/palm scanner 16 and an imaging device 14. The finger/palm scanner 16 can operate to capture a fingerprint, palm print, plan vein pattern, etc. of a user for verification of identity. The imaging device 14 can operate to capture an image of a part of the user, e.g., face, iris, etc., for verification. For example, the imaging device 14 can be a multispectral camera system. In some embodiments, the access control unit 11 can also include a thermometer that can operate to capture a temperature of the user.

The different biometric scanning solutions can work individually but can auto-engage the next biometric scanning option based on a level of security priority if prior scanning login attempts fail. For example, if the imaging device 14 fails in facial capture, the imaging device 14 can attempt iris capture. If the imaging device 14 fails in iris capture, the finger/palm scanner 16 can engage as the primary scanning method. If the finger/palm scanner 16 fails, the user can be prompted with a phone number to call for further action. In embodiments, any number of different biometric scanning solutions can be used in sequence.

Additionally, the biometric scanning devices can operate in combination to provide capture different types of verification data from the user to provide multi-factor authentication. Additionally, the biometric scanning devices can operate as backups or fail safes, if one of the devices is not functioning. While FIGS. 1 and 2 illustrates several biometric scanners, the access control unit 11 can include additional biometric scanners and/or additional biometric scanners can be coupled to the access control unit 11.

The access control unit 11 can also include a display device 12, a radio frequency identification (RFID) sensor, an optical scanner 22, and an integrated printer 20. The access control unit 11 can also include input/output (I/O) devices, such as keyboards, mice, trackballs, microphones, speakers, etc. The display device 12 can operate to display information related to the user verification and access control process. The display device 12 (and/or I/O devices) can operate to capture information from the user and operate the access control unit 11. For example, the display device 12 (and/or I/O devices) can be used to receive identification information of the user, access information (e.g., username/password), and the like. The display device 12 can include a display screen such as a light-emitting diode ("LED") display, an organic LED ("OLED") display, an active-matrix OLED ("AMOLED") display, a liquid crystal display ("LCD"), a thin-film transistor ("TFT") LCD, a plasma display, a quantum dot ("QLED") display, and the like. The display device 12 can include a resistive touchscreen, a capacitive touchscreen, and the like. The I/O devices can include an acoustic element such as a speaker, a microphone, and so forth. The I/O devices can include a button, a switch, a keyboard, a touch-sensitive surface, and the like.

The RFID sensor 18 can be used to capture data from an RFID tag. The optical scanner 22 can be used to capture machine-readable data such as barcode, QR codes, and the like. In embodiments, the access control unit 11 can utilize RFID data and/or the QR codes that are refreshed periodically (every 5-15 seconds specifically) to eliminate sharing and/or RFID data and/or QR codes amongst users. The integrated printer 20 can be utilized to print credentials for the user once the verification process has been completed.

The access control unit 11 can also include adjustment handles 24. The adjustment handles 24 can allow a user to adjust the tilt and positioning display device 12. In some embodiments, the mobile AMD 100 can include a power supply such as a battery, solar cell, etc. In some embodiments, the mobile AMD 100 can include a power supply port 28 for coupling a remote power supply.

In some embodiments, once user verification information has been captured, verification requests can be processed by the mobile AMD 100. In some embodiments, the verification requests can be transmitted to a remote access control system. The remote access control system can determine verification status, for example, nearly instantaneously, and sends a verification response back to the access control unit 11. Once the access control unit 11 receives approval/denial back from the remote access control system, the display device 12 can provide the status of user and automatically print a badge, using the printer 20, if approved. If access is denied, the display device 12 can display on-screen instructions for next steps.

FIG. 3 illustrates a verification method that can be performed by the mobile AMD 100, according to aspects of the present disclosure. While FIG. 3 illustrates examples of stages of the verification method, additional stages can be added, and existing stages can be removed, reordered, and/or modified.

As illustrated in FIG. 3, the method can begin with a user approaching the mobile AMD 100 for verification. The user can request verification using one or more methods such as biometric identification and pre-generated code. The user can initiate verification by using the access control unit 11. In embodiments, the user can scan a machine-readable code using the optical scanner 22 and/or the RFID scanner 18.

For example, the user can schedule an appointment through a verification application, e.g., a web-based cloud or mobile application, that verifies the user. The application can provide a machine-readable code to the user to be scanned by the mobile AMD 100. In another example, the user may have an RFID tag, e.g., an employee or regular visitor, and the RFID code can be supplied to the RFID tag. Once the pre-generated code is scanned by the mobile AMD 100, the code is verified by the mobile AMD 100 and/or a remote access verification system. If the code is not verified, access can be denied.

If the code is verified, the mobile AMD 100 can perform biometric verification. The user can supply biometric information using the biometric scanning devices, for example, the finger/palm scanner 16 and/or the imaging device 14. In some embodiments, the user can provide one type of biometric information, e.g., facial scan, fingerprint scan, palm scan, etc. In some embodiments, the user can provide multiple types of biometric information, e.g., facial scan, fingerprint scan, palm scan, etc.

Once the biometric information is received, the biometric information can be verified. The biometric information can be verified by the mobile AMD 100 or transmitted to a remote access control system to verify the information. If the biometric information cannot be verified, the user is denied access. If the biometric information is verified, the user is granted access to the facility. The mobile AMD 100 prints a badge using the printer 20. For example, the badge can be a sticker label that can be affixed to the user.

In embodiments, the badge can include information that describes the access granted to the user, e.g., floors, rooms, area, etc., and the duration of the access. The badge can also include information that identifies the user, such as the user's name and a photo captured by the imaging device 14. The badge can also include machine-readable codes that grant access, through security checkpoints, to various areas of the facility based on the access level granted to the user.

In embodiments, the mobile AMD 100 and/or the remote access control system can include a processing device coupled to a communication device. The processing device is also coupled to a memory device. In embodiments, the communication interface enables the mobile access control system to communicate with one or more of the mobile AMDs 100 and systems via one or more networks. To perform the process described herein, the mobile AMD 100 and/or the remote access control system can store and execute a verification module. The verification module can include the necessary logic, instructions, and/or programming to perform the processes and methods described herein. The verification module as well as the software of the mobile AMD 100 can be written in any programming language. The memory device can also include a database that stores information and data associated with the process and methods described herein. The database can store verification information for the user and access and security policies.

The processing device of the mobile AMD 100 and/or the remote access control system can be and/or include a processor, a microprocessor, a computer processing unit ("CPU"), a graphics processing unit ("GPU"), a neural processing unit, a physics processing unit, a digital signal processor, an image signal processor, a synergistic processing element, a field-programmable gate array ("FPGA"), a sound chip, a multi-core processor, and so forth. As used herein, "processor," "processing component," "processing device," and/or "processing unit" can be used generically to refer to any or all of the aforementioned specific devices, elements, and/or features of the processing device.

The memory device of the mobile AMD 100 and/or the remote access control system can be and/or include computerized storage medium capable of storing electronic data temporarily, semi-permanently, or permanently. The memory device 108 can be or include a computer processing unit register, a cache memory, a magnetic disk, an optical disk, a solid-state drive, and so forth. The memory device can be and/or include random access memory ("RAM"), read-only memory ("ROM"), static RAM, dynamic RAM, masked ROM, programmable ROM, erasable and programmable ROM, electrically erasable and programmable ROM, and so forth. As used herein, "memory," "memory component," "memory device," and/or "memory unit" can be used generically to refer to any or all of the aforementioned specific devices, elements, and/or features of the memory device.

The communication device of the mobile AMD 100 and/or the remote access control system enable communication between themselves and with other devices and systems. The communication device can include, for example, a networking chip, one or more antennas, and/or one or more communication ports. The communication device can generate radio frequency (RF) signals and transmit the RF signals via one or more of the antennas. The communication device can receive and/or translate the RF signals. The communication device can transceive the RF signals. The RF signals can be broadcast and/or received by the antennas.

The communication device can generate electronic signals and transmit the RF signals via one or more of the communication ports. The communication can receive the RF signals from one or more of the communication ports. The electronic signals can be transmitted to and/or from a communication hardline by the communication ports. The communication device can generate optical signals and transmit the optical signals to one or more of the communication ports. The communication device can receive the optical signals and/or can generate one or more digital signals based on the optical signals. The optical signals can be transmitted to and/or received from a communication hardline by the communication port, and/or the optical signals can be transmitted and/or received across open space by the networking device.

The communication device of the mobile AMD 100 and/or the remote access control system can include hardware and/or software for generating and communicating signals over a direct and/or indirect network communication link. For example, the communication device can include a universal serial bus ("USB") port and a USB wire, and/or an RF antenna with Bluetooth™ programming installed on a processor, such as the processing component, coupled to the antenna. In another example, the communication component can include an RF antenna and programming installed on a processor, such as the processing device, for communicating over a wireless fidelity ("WiFi") WiFi and/or cellular network. As used herein, a direct link can include a link between two devices where information is communicated from one device to the other without passing through an intermediary. For example, the direct link can include a Bluetooth™ connection, a Zigbee connection, a Wifi Direct™ connection, a near-field communications ("NFC") connection, an infrared connection, a wired universal serial bus ("USB") connection, an ethernet cable connection, a fiber-optic connection, a firewire connection, a microwire connection, and so forth. In another example, the direct link can include a cable on a bus network.

An indirect link can include a link between two or more devices where data can pass through an intermediary, such as a router, before being received by an intended recipient of the data. For example, the indirect link can include a WiFi connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications ("GSM") standard, a code division multiple access ("CDMA") standard such as the universal mobile telecommunications standard, an orthogonal frequency division multiple access ("OFDMA") standard such as the long term evolution ("LTE") standard, and so forth.

In embodiments, the components and functionality of the remote access control system can be hosted and/or instantiated on a "cloud" or "cloud service." As used herein, a "cloud" or "cloud service" can include a collection of computer resources that can be invoked to instantiate a virtual machine, application instance, process, data storage, or other resources for a limited or defined duration. The collection of resources supporting a cloud can include a set of computer hardware and software configured to deliver computing components needed to instantiate a virtual machine, application instance, process, data storage, or other resources. For example, one group of computer hardware and software can host and serve an operating system or components thereof to deliver to and instantiate a virtual machine. Another group of computer hardware and software can accept requests to host computing cycles or processor time, to supply a defined level of processing power for a virtual machine. A further group of computer hardware and software can host and serve applications to load on an instantiation of a virtual machine, such as an email client, a browser application, a messaging application, or other applications or software. Other types of computer hardware and software are possible.

In embodiments, the components and functionality of the remote access control system can be and/or include a "server" device. The term server can refer to functionality of a device and/or an application operating on a device. The server device can include a physical server, a virtual server, and/or cloud server. For example, the server device can include one or more bare-metal servers such as single-tenant servers or multiple-tenant servers. In another example, the server device can include a bare metal server partitioned into two or more virtual servers. The virtual servers can include separate operating systems and/or applications from each other. In yet another example, the server device can include a virtual server distributed on a cluster of networked physical servers. The virtual servers can include an operating system and/or one or more applications installed on the virtual server and distributed across the cluster of networked physical servers. In yet another example, the server device can include more than one virtual server distributed across a cluster of networked physical servers.

Various aspects of the systems described herein can be referred to as "content" and/or "data." Content and/or data can be used to refer generically to modes of storing and/or conveying information. Accordingly, data can refer to textual entries in a table of a database. Content and/or data can refer to alphanumeric characters stored in a database. Content and/or data can refer to machine-readable code. Content and/or data can refer to images. Content and/or data can refer to audio and/or video. Content and/or data can refer to, more broadly, a sequence of one or more symbols. The symbols can be binary. Content and/or data can refer to a machine state that is computer-readable. Content and/or data can refer to human-readable text.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed is:

1. A device for verification, comprising:

an access control unit comprising:

a display device disposed on a front face of the access control unit and configured to display verification status information to a user and to receive input from the user, wherein the display device is tiltably mounted to the access control unit;

an imaging device mounted to a top portion of the access control unit, above the display device, and configured to capture image-based biometric data from the user;

a radio frequency identification (RFID) sensor mounted to a lateral side of the access control unit and configured to capture RFID data from the user;

a contact-based biometric scanner mounted to a front-lower portion of the access control unit, below the display device, and configured to capture contact-based biometric data from the user; an optical scanner mounted to the front face of the access control unit below the display device and configured to capture machine-readable code data; and a pedestal coupled to the access control unit comprising one or more wheels;

at least one processor and a memory storing instructions that, when executed by the at least one processor, cause the device to:

receive, at a mobile access management device positioned at an entry point of a hospital facility, a request from a user to access the hospital facility;

scan, by the optical scanner or a radio frequency identification (RFID) sensor of the mobile access management device, a machine-readable code associated with the user to perform a first stage of verification;

upon successful first-stage verification of the machine-readable code, capture, by a plurality of biometric information capture devices of the mobile access management device, at least two types of biometric information from the user;

verify the at least two types of biometric information, wherein verifying comprises at least one of: processing the biometric information locally at the mobile access management device or transmitting the biometric information to a remote access control system for processing, wherein said processing is configured to auto-engage the next biometric scanning option based on an access level of security priority if prior scanning login attempts fail; and upon successful verification, automatically printing, by a printer of the mobile access management device a badge for the user that grants access to the hospital facility, the badge identifying said access level granted to the user and a duration of the access; and display, on the display device of the mobile access management device, instructions to the user based on a result of the verification.

2. The device of claim 1, wherein the image-based biometric data is facial information;

wherein the contact-based biometric scanner is a fingerprint scanner;

further comprising a non-contact palm scanner;

wherein the optical scanner is a barcode reader; and wherein the RFID sensor is a radio frequency scanner.

3. The device of claim 1, wherein the access control unit further comprises a thermometer configured to capture a temperature of the user.

4. The device of claim 1, wherein the display device comprises a touch-sensitive display.

5. The device of claim 1, wherein the access control unit further comprises at least one communication device for communication with a remote access control system, the remote access control system operating to verify information captured by the access control unit.

6. The device of claim 1, wherein the access control unit further comprises a printer integrated into the access control unit below the display device and configured to print a credential document upon successful verification of the user.

7. The device of claim 6, further comprising:

a pair of adjustment handles disposed on opposing lateral sides of the display device and configured to permit tilting adjustment of the display device relative to the access control unit; and at least one communication device configured to communicate verification data to a remote access control system and to receive a verification response therefrom;

wherein the access control unit is configured to acquire at least two independent types of biometric identification information from a user for multi-factor verification; and the pedestal further comprising:

a base plate having a substantially flat lower surface configured to rest on a floor surface; and a vertical column extending upwardly from the base plate, wherein the vertical column is centrally positioned relative to the base plate;

the one or more wheels mounted to the base plate at spaced-apart locations along a periphery of the base plate, wherein at least one of the one or more wheels comprises a lockable caster configured to selectively fix the position of the mobile access management device.

8. A method for verification, comprising:

receiving, at a mobile access management device positioned at an entry point of a hospital facility, a request from a user to access the hospital facility;

scanning, by an optical scanner or a radio frequency identification (RFID) sensor of the mobile access management device, a machine-readable code associated with the user to perform a first stage of verification;

upon successful first-stage verification of the machine-readable code, capturing, by a plurality of biometric information capture devices of the mobile access management device, at least two types of biometric information from the user;

verifying the at least two types of biometric information, wherein verifying comprises at least one of: processing the biometric information locally at the mobile access management device or transmitting the biometric information to a remote access control system for processing, wherein said processing is configured to auto-engage the next biometric scanning option based on an access level of security priority if prior scanning login attempts fail; and upon successful verification, automatically printing, by a printer of the mobile access management device a badge for the user that grants access to the hospital facility, the badge identifying said access level granted to the user and a duration of the access; and displaying, on a display device of the mobile access management device, instructions to the user based on a result of the verification.

* * * * *